Jan. 16, 1940.　　　C. KÜHNEL　　　2,187,426
MIXING BOWL FASTENER
Filed July 17, 1937
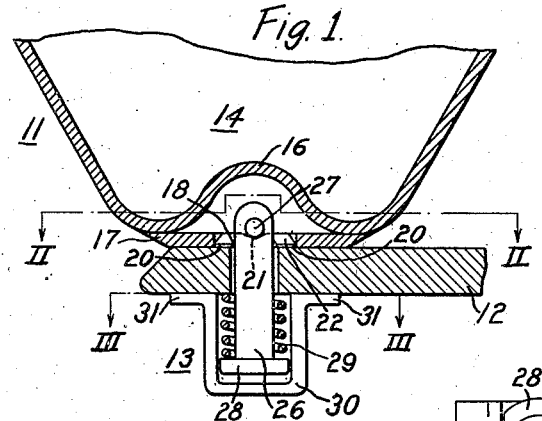
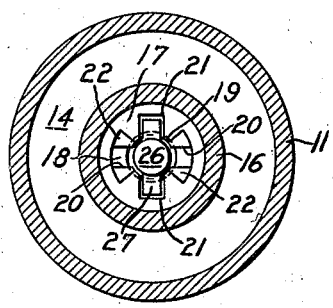
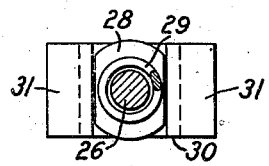
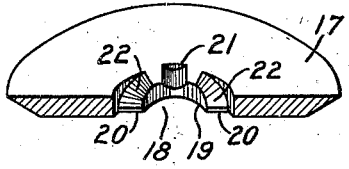
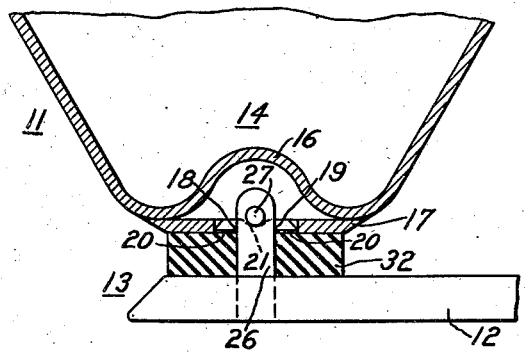
WITNESSES:
Wm. B. Sellers
K.E. Hepler
INVENTOR
Carl Kuhnel.
BY
W.R. Coley
ATTORNEY Patented Jan. 16, 1940

2,187,426

UNITED STATES PATENT OFFICE 2,187,426

MIXING BOWL FASTENER

Carl Kühnel, Berlin-Charlottenburg, Germany, assignor to Westinghouse Electric & Manufacturing Company, East Pittsburgh, Pa., a corporation of Pennsylvania Application July 17, 1937, Serial No. 154,322
In Germany July 18, 1936

1 Claim. (Cl. 24—221)

My invention relates to food mixers and the like, and more particularly to the method of attaching mixing bowls or the like to a supporting base therefor.

With those methods of attaching a vessel to a supporting base known to the prior art, such vessels have either been set too loosely on the correspondingly formed base or the vessel has been manually fastened with special screws, bolts or levers and cams, etc. By using a correspondingly formed base to support a vessel, difficulties and delays have been encountered in properly setting the vessel on and removing it from such supporting device. On the other hand, in fastening a vessel to a supporting base with manually operated attaching devices, it has been necessary to either leave a portion of such device extend outside the supporting base, resulting in an inartistic structure, or in the case of supporting devices totally enclosed within the supporting structure, it has been necessary to tilt the structure in order to attach the vessel upon such support.

It is, therefore, an object of my invention to provide an automatically operated device which will make possible a rapid and readily removable attachment between the vessel and the supporting structure.

A further object of my invention is to provide a latching device between the vessel and supporting device therefor which will be totally enclosed within the supporting structure.

A further object of my invention is to provide means whereby a vessel may be resiliently mounted upon and rigidly attached to a supporting structure.

Other objects of my invention will either be pointed out specifically in the course of the following description of a device embodying my invention, or will be apparent from such description.

In the accompanying sheet of drawing,

Figure 1 represents a partial sectional view of a device embodying my invention;

Fig. 2 is a sectional view taken along line II—II of Fig. 1;

Fig. 3 is a sectional view taken along line III—III of Fig. 1;

Fig. 4 is an enlarged perspective view of a half portion of the device shown in Fig. 1; and Fig. 5 is a partial sectional view of a modified form of device embodying my invention.

Referring to the accompanying drawing, I show a vessel 11 removably attached to a supporting base 12 by means of a latching device 13.

The vessel 11, which may be of any suitable shape or size desired, has a double bottom structure, as indicated by the reference character 14. The inner or upper portion 16 of the bottom structure 14 of the vessel is upwardly bulged at the central portion thereof a suitable amount to permit the ready access of the latching device 13 thereto. The lower bottom portion 17 may be rigidly attached to the vessel 11 in any suitable manner and is preferably substantially flat.

An irregularly shaped aperture 18 is located substantially at the center of the lower bottom portion 17. The irregularly shaped aperture 18 is formed by a substantially circular aperture 19 in the central portion thereof and a pair of oppositely disposed notched apertures 20 extending radially therefrom. A pair of semi-circular radial niches 21 are cut within the top surface of the lower bottom portion 17 at oppositely disposed points substantially midway between the notched apertures 20. The side walls of the notched apertures 20 are tapered upwardly from approximately the bottom surface of the bottom portion 17 to a point substantially two-thirds the distance between such notched aperture and the circular niche 21, substantially as indicated in Fig. 4 by the reference characters 22, there being four of such inclined surfaces.

The latching device 13 may comprise an upwardly projecting bar 26 with a cross pin member 27 located at substantially the top thereof and preferably integral therewith. The axis of the cross pin 27 is substantially at right angles to the vertical axis of the projecting bar 26. The lower end of the bar 26 has an irregularly shaped shoulder 28, preferably integral therewith. It is preferred that the upper end of the upwardly projecting bar 26 extend above the surface of the supporting base 12 a distance such that the center line of the cross-pin 27 will be disposed above the top surface of the supporting base a distance equal to substantially one-half the thickness of the lower bottom plate 17.

A suitable resilient device 29 is located between the supporting base 12 and the shoulder 28 as shown in Fig. 1. It is to be understood that this resilient member 29 may be a coiled spring or any other suitable device which will bias the bar 26 downwardly. A U-shaped strap 30 is disposed about the bar 26 and shoulder 28 and has a plurality of lips 31 located on the top portion thereof. The U-shaped member 30 may be rigidly attached to the supporting base 12 by means of the lips 31 in any suitable manner. It is, therefore, obvious that the U-shaped member 30 will then limit the downward motion of the projecting bar 26 and prevent such bar from being removed from the supporting structure 12 unless the member 30 is first removed.

When the vessel 11 is placed upon the supporting base 12, the position thereof is so selected that the bar 26 will project within the irregularly shaped aperture 18 located in the lower bottom portion 17 and that simultaneously the cross pin 27 will proceed through the notched apertures 20. The cross pin 27 will then be substantially aligned with the tapered portion 22, and if the vessel 11 be rotated in either direction, the cross pin 27 will first ride upwardly upon the inclined portions 22 and will then drop within the semicircular niches 21.

Due to the downwardly biasing action of the resilient member 29, the bar 26 and operatively associated cross pin 27 will securely hold the vessel 11 upon the supporting base 12. To remove the vessel from the supporting base, it is merely necessary to again rotate the vessel 11 in either direction to such an extent that the cross pin 27 will glide downwardly along the inclined surfaces 22 and out through the notched apertures 20, whereupon the vessel 11 may readily be removed from the supporting structure.

If it be desired, the bar 26 may be rigidly attached to the supporting base 12 in any suitable manner, as shown in Fig. 5, and may have a resilient member, such as a rubber cushion 32, resting upon the supporting base 12 and about the bar 26. With the resilient member 32 being of sufficient thickness, such member will restrain the vertical movements of the vessel 11 and act as a cushion therefor when such vessel has been placed over the bar 26. It is to be understood that the preferred thickness of the resilient member 32, in relation to the position of the cross pin 27 on the bar 26, is such that as the vessel 11 is placed thereon, with the cross pin 27 located within the notched apertures 20, such cross pin will be substantially in line with the lower ends of tapered side surfaces 22 of the notched apertures. With the vessel located upon the resilient member 32 in such a manner, it is obvious that as the vessel 11 is rotated about the bar 26 as an axis, the cross pin 27 as it slides upwardly along the tapered surfaces 22, will pull the vessel 11 downwardly, and with a continued rotation of such vessel the cross-pin 27 will become operatively engaged with the niches 21, and, therefore, firmly hold the vessel 11 upon the resilient member 32. Due to this coaction of the cross-pin 27 with the bottom of the vessel 11, such vessel is firmly but yet resiliently mounted upon the supporting structure 12. With the vessel mounted upon the supporting structure 12 in such a manner with the cross pin 27 embedded within the niches 21, it is apparent that such vessel 11 will remain fixed until it has been rotated to a position wherein pin 27 is disposed in apertures 20, which will permit the vessel to be removed from the bar 26.

It is, therefore, obvious that when using a device as hereinabove described for rigidly attaching a vessel upon a suitable cooperating supporting base, such vessel may be automatically attached thereto without the need of manually operating any part of the supporting structure or without tilting such structure to perform such manual operation.

It is likewise obvious that with a device embodying my invention a vessel may be rapidly and accurately attached to a suitable supporting device with either a rigid or a resilient connection.

Various further modifications may be made in the device embodying my invention, such as interchanging the illustrated automatic attachment parts between the bowl and the base, without departing from the spirit and scope thereof and I desire, therefore, that only such limitations shall be placed thereon as are imposed by the prior art and the appended claim.

I claim as my invention:

A fastener comprising an upper flat member, a stationary support therefor, said member having an irregularly shaped aperture therein and said support housing a bar at all times projecting through it and said aperture, a lateral projection near the top of said bar above said aperture, and means biasing said bar and projection towards engagement with said aperture to effect engagement of said pin therewith, certain of the side walls defining said aperture gradually sloping towards the upper face of said flat member, and said member having a depression in said face intermediate said side walls, said engagement of said pin selectively occurring either with said sloping side walls or with said depression.

CARL KÜHNEL.